(12) United States Patent
Kaler et al.

(10) Patent No.: US 7,882,547 B2
(45) Date of Patent: Feb. 1, 2011

(54) SECURELY CALLING WEB SERVICES FROM MACROS

(75) Inventors: Christopher G. Kaler, Sammamish, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1304 days.

(21) Appl. No.: 11/299,463

(22) Filed: Dec. 12, 2005

(65) Prior Publication Data

US 2007/0150741 A1 Jun. 28, 2007

(51) Int. Cl.
H04L 29/06 (2006.01)
(52) U.S. Cl. .......................................... 726/5; 709/229
(58) Field of Classification Search ................... None
See application file for complete search history.

(56) References Cited

U.S. PATENT DOCUMENTS

| 6,560,633 | B1 | 5/2003 | Roberts et al. |
| 6,792,605 | B1 | 9/2004 | Roberts et al. |
| 7,774,830 | B2 * | 8/2010 | Dillaway et al. ............... 726/9 |
| 2003/0115548 | A1 | 6/2003 | Melgar |
| 2004/0064529 | A1 | 4/2004 | Meredith et al. |
| 2005/0015591 | A1 | 1/2005 | Thrash et al. |
| 2005/0086178 | A1 | 4/2005 | Xie et al. |
| 2005/0125771 | A1 | 6/2005 | Vitanov et al. |
| 2005/0166180 | A1 | 7/2005 | Lemon et al. |
| 2005/0251853 | A1 | 11/2005 | Bhargavan et al. |
| 2006/0015625 | A1 | 1/2006 | Ballinger et al. |
| 2006/0015728 | A1 | 1/2006 | Ballinger et al. |
| 2006/0026262 | A1 | 2/2006 | Abbott et al. |
| 2006/0195690 | A1 * | 8/2006 | Kostal et al. ................. 713/156 |

FOREIGN PATENT DOCUMENTS

GB 2413663 11/2005

OTHER PUBLICATIONS

Andrew D. Gordon and Riccardo Pucella "Validating a Web Service Security Abstraction by Typing", 64 pages Dec. 2002 Technical Report MSR-TR-2002-108 http://research.microsoft.com/~adg/Publications/MSR-TR-2002-108.pdf.
Chapter 2 "Web service interface description languages", pp. 23-34 http://www.service-description.com/papers/PJOCh2.pdf.
Reiner Kraft "A Model for Network Services on the Web", 6 pages http://www.soe.ucsc.edu/~rekraft/papers/Kraft%201022IC.pdf.
Sebastian Bossung, Hans-Werner Sehring, and Joachim W. Schmidt "Conceptual Content Management for Enterprise Web Services", 11 pages Software Technology and Systems Institute (STS) Hamburg University of Science and Technology (TUHH) http://www.sts.tu-harburg.de/~se.bossung/pdf/bss05-ccm4ws.pdf.

* cited by examiner

*Primary Examiner*—Benjamin E Lanier
*Assistant Examiner*—Simon Kanaan
(74) *Attorney, Agent, or Firm*—Workman Nydegger (57) ABSTRACT

A method of securing communications between an application that includes a macro and a Web Service. The method includes an act of, at the macro, generating a request for data. The request for data comprises generating commands for retrieving data, generating security information, and embedding the commands for retrieving data and the security information in a request. The request for data is sent to the Web Service. The requested data is received from the Web Service if the security information provides appropriate authorization to receive the requested data.

20 Claims, 5 Drawing Sheets

SECURELY CALLING WEB SERVICES FROM MACROS

BACKGROUND

Computing technology has revolutionized the way people work and play and has contributed enormously to the advancement of humankind. Computers now aid in enumerable applications such as word processing, computer simulations, advanced gaming, voice recognition, and much more. Computing systems now come in a wide-variety of forms including, for example, desktop computers, laptop computers, Personal Digital Assistants (PDAs), and even mobile telephones and devices.

One use of computing systems that has become increasing more important in recent years is the implementation of Web Services. Web Services is a standardized way of integrating computer applications that may be configured on different computer platforms. For example, the standardized Web Services protocol includes standardized XML (extensible markup language) documents that can be used with SOAP (Simple Object Access Protocol) messages and WSDL (Web Services Description Language) descriptions to integrate applications without an extensive knowledge of the applications being integrated.

A primary reason that Web Services are useful is that they provide a loose coupling between an application that uses the Web Service and the Web Service itself. This allows either the application or the Web Service to change without negatively affecting the other, as long as a Web Service interface remains unchanged. The use of Web Services has thus greatly enhanced the use of computing applications over networks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described in further detail herein includes a method of securing communications between an application that includes a macro and a Web Service. The method includes an act of, at the macro, generating a request for data. The request for data comprises generating commands for retrieving data, generating security information, and embedding the commands for retrieving data and the security information in a request. The request for data is sent to the Web Service. The requested data is received from the Web Service if the security information provides appropriate authorization to receive the requested data.

In another embodiment, a method of securing communications between an application and a Web Service is described. The method includes receiving security information from the application at the Web Service and receiving a request for data from the application at the Web Service. The requested data from the Web Service is provided to the application if the security information provides appropriate authorization to provide the requested data.

Yet another embodiment described herein includes a method of communicating with a Web Service. A computing system includes one or more macros and a macro processing module. The method includes the macro processing module determining that a Web Service comprises one or more access restrictions. The macro processing module then verifies that a macro has authority to access the Web Service. The verification comprises receiving a request for data from the macro, the request for data includes a command for retrieving data and security information, and processing the security information against the access restrictions to determine appropriate authorization. If the security information includes appropriate authorization, the request for data is communicated to the Web Service by the macro processing module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of embodiments described herein can be obtained, a more particular description of the embodiments briefly described above will be rendered by reference to specific embodiments thereof which are illustrated in the appended drawings. Understanding that these drawings depict only typical embodiments and are not therefore to be considered to be limiting of its scope, the invention will be described and explained with additional specificity and detail through the use of the accompanying drawings in which.

DETAILED DESCRIPTION

Some embodiments described herein extend to methods and systems for securely calling Web Services from a macro of an application. Embodiments may comprise a special purpose or general-purpose computer including various computer hardware or modules, as discussed in greater detail below.

One embodiment includes a computing environment that includes an application with one or macros and a Web Service. The macro in the application generates a request for data from the Web Service. The request for data includes a command for retrieving the requested data. In addition, to secure the communication between the macro and the Web Service, security information is also generated. The security information may be a signature or a token, one or more policies, and/or one or more claims provided by the macro author or the owner of the Web Service. The request for data is sent to the Web Service. The Web Service sends the requested data to the application if security information generated by the macro provides appropriate authority.

Another embodiment includes securing a communication between an application and the Web Service at the Web Service. The Web Service receives a request for data from an application, possibly generated from a macro of the application. The Web Service also receives security information from the application in order to secure the communication between the application and the Web Service. In some embodiments, the security information is part of the request for data. The security information may be, for example, a signature or token. The security information may also be one or more claims provided by the owner of the Web Service to a macro author for proving authorization. The Web Service verifies that the security information provides appropriate authorization and then provides the requested data to the application.

In yet another embodiment, a computing environment includes a Web Service, one or more macros and a macro processing module. The macro processing module determines that a Web Service has one or more access restrictions. The access restrictions include data that is used to specify access conditions and parameters for the Web Service. The macro generates a request for data including a command for retrieving the requested data, and to secure the communication between the macro and the Web Service, security information such as a signature and/or a token. The request for data is provided to the macro processing module, which in turn verifies that the macro has authority to access the Web Service. For example, the macro processing module may verify that the request for data includes a required signature. The macro processing module then communicates the request to the Web Service.

Often an application supports a macro that when executed automatically provides a call to a Web Service for requested data. However, calling the Web Service by a macro may leave the application vulnerable to accessing a Web Service that may be harmful to the application. For example, suppose an application contains a user's stock portfolio and includes a macro that calls a Web Service that provides data on current stock prices. This call may allow a malicious party to access the user's stock information. In addition, the Web Service is vulnerable to a macro that may be harmful to the Web Service. Embodiments described herein provide methods and systems for securely calling Web Services by a macro by securing the communication between the macro and the Web Service.

Figure 1A:
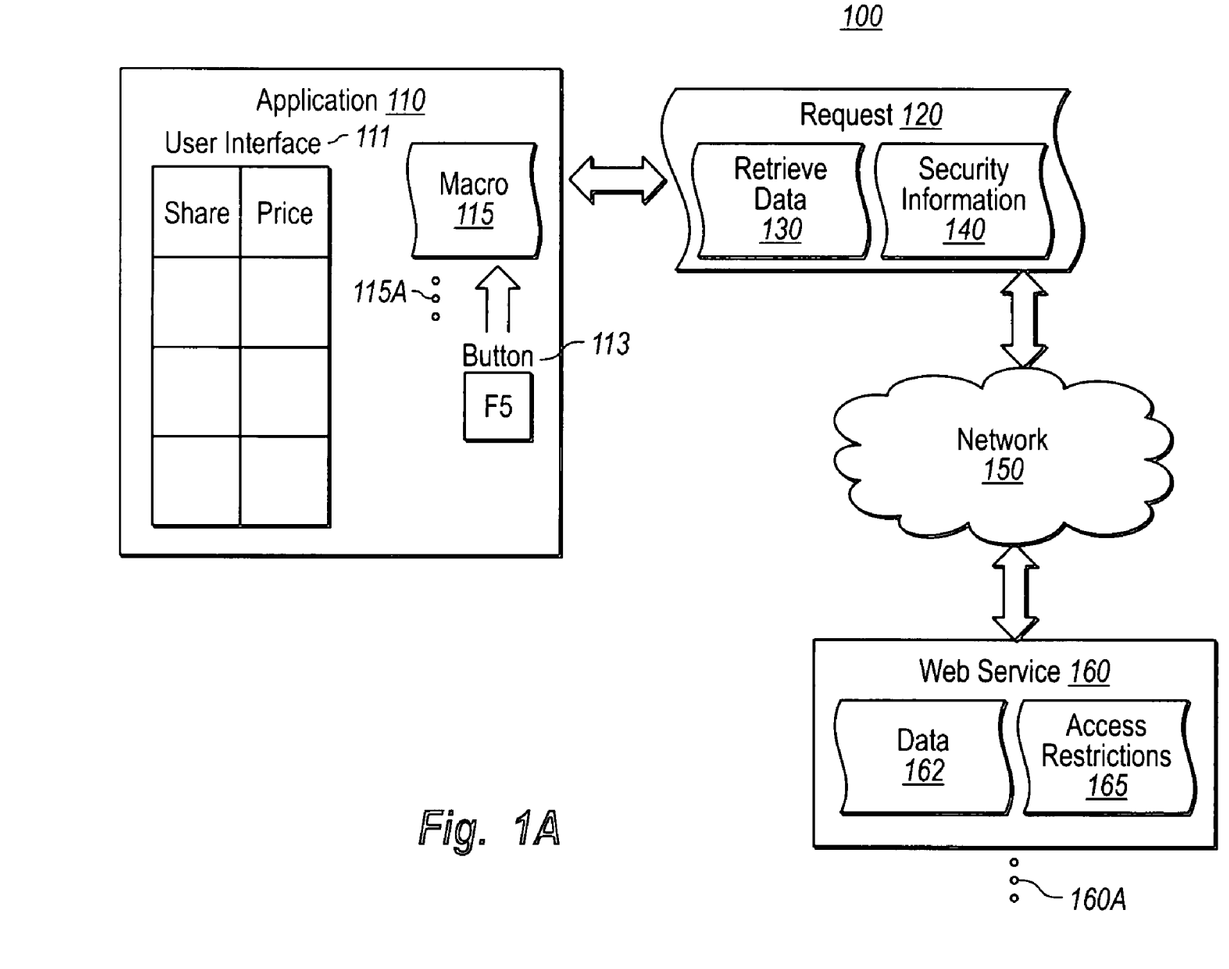
FIGS. 1A and 1B illustrate a computing environment where specific embodiments may be implemented.
Figure 1B:
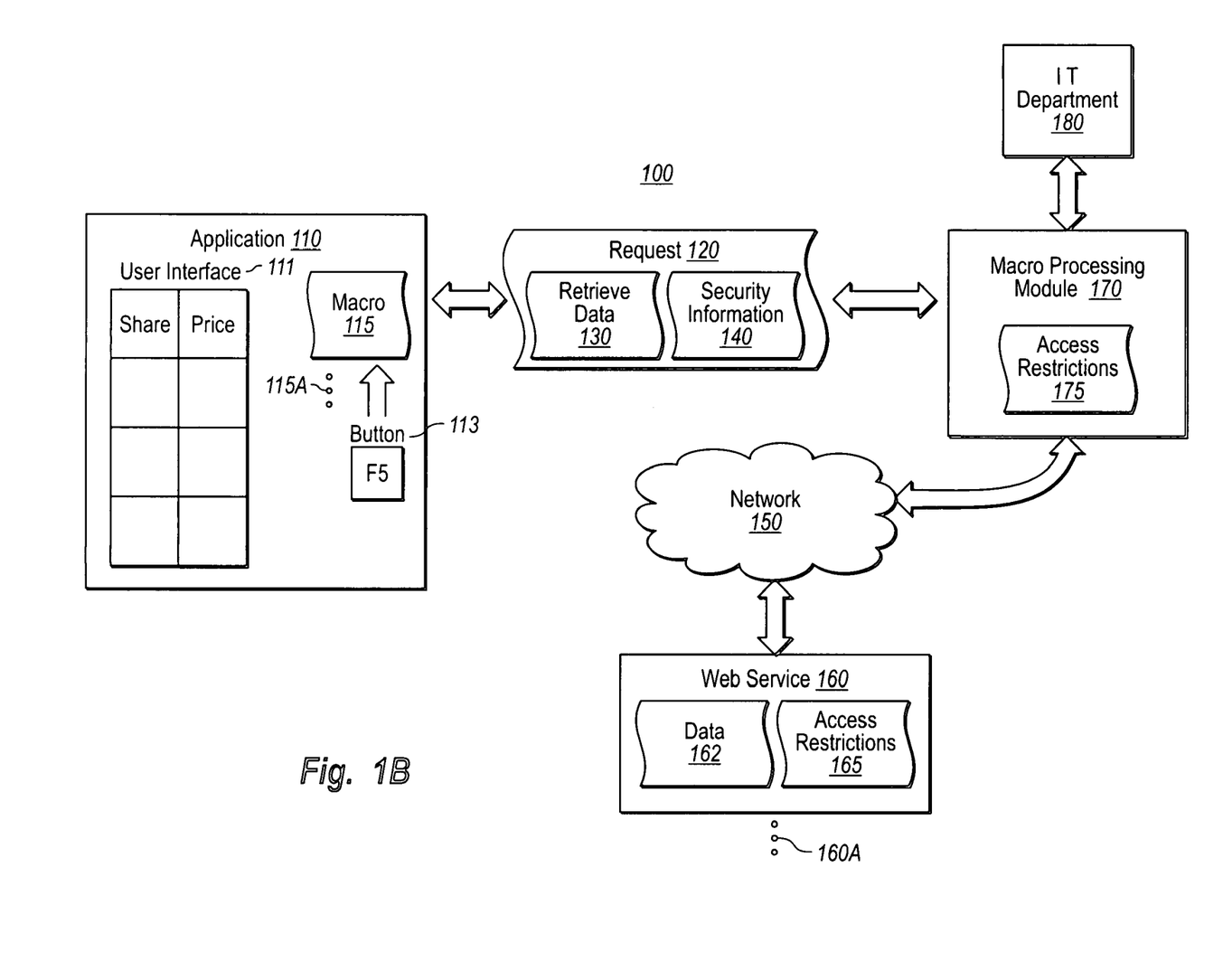

FIGS. 1A and 1B illustrate a computing environment 100 for securely calling Web Services from a macro. Computing environment 100 depicts various modules and components that can be used when implementing embodiments described herein. Note that computing environment 100 is illustrated by way of example only and should not be used to limit the scope of the appended claims. It will be obvious to one of ordinary skill in the art after having read this description that there are numerous other computing environments that may be used to implement embodiments described herein.

Computing environment 100 includes an application 110. Application 110 may, for example, a computer application that is capable of supporting one or more macros. Examples of well known applications that support macros are spreadsheets and word processing applications.

Application 110 includes a user interface 111. The user interface 111 allows a user to actively interface with the application 110. The user interface 111 may be specific to each of the different types of applications 110. For example, the user interface 111 that is depicted includes a spreadsheet such as an Excel® spreadsheet that is configured to display the number of stock shares and the current price of stocks in a user's stock portfolio. User interfaces 111 of other applications such as a word processing application may look different than the interface of the spreadsheet.

Application 110 further includes a macro 115. Application 110 may also include any number of additional macros as illustrated by ellipses 115A. Macro 115 and potentially macros 115A may be created by any reasonable technique. In some embodiments, macros 115 are embedded in application 110. In other embodiments, macros 115 may be accessed from some other portion of computing environment 100 by application 110. Macros 115 may be configured to call one or more Web Services 160 when executed by application 110. In the description and claims a macro may include, for example, any computing symbol, name, key, set of code, or any other means that is used to represent an action or command and that when executed or implemented causes that action or command to occur. For example, a macro may be a set of code that represents calling a Web Service and when executed causes the Web Service to be called. Macros may further be implemented by employing scripts.

In some embodiments, application 110 may include a button or keystroke command 113. Button 113, which is designated as button F5 in FIG. 1, may be configured to cause application 110 to execute macro 115 when pressed by a user. In other embodiments, there may be other techniques that are implemented to cause the execution of macro 115, such as, for example a command may be typed into the application itself to cause the execution of the macro. In another alternative embodiment, automatic execution of macro 115 may be accomplished by a timed execution or in response to actions by one or more applications.

Computing environment 100 also includes a Web Service 160, and potentially any number of additional Web Services as illustrated by ellipses 160A, that are interconnected to application 110 by a network 150 using for example, a network protocol. Exemplary protocols may include but are not limited to Internet Protocol (IP) or File Transfer Protocol (FTP). Network 150 may be, for example, a wide area network such as the Internet that allows data transfer between two or more computing systems connected through public networks. Alternatively, network 150 may be a local area network. Other network models may also be used by embodiments disclosed herein.

Web Service 160 (and potentially Web Services 160A) includes various data 162. For example, Web Service 160 may be maintained by a stock exchange or other brokerage service and be configured to include data 162 about current stock prices. Alternatively, Web Service 160 may include data 162 that lists a merchant's inventory that is for sale. It will be appreciated by one skilled in the art that Web Service 160 may contain data 162 regarding numerous different subjects or categories.

In some embodiments, the owner of Web Service 160 may wish to restrict access to the Web Service. In this case, Web Service 160 may include access restrictions 165. Access restrictions 165 may include data such as one or more policies that specify the appropriate authorization information required to access the data 162 in Web Service 160. If an application does not provide appropriate authorization, Web Service 160 will not allow access to data 162. Access restrictions 165 may also be utilized by other components or modules of computing environment 100 to determine whether a request for data from an application should be communicated to the Web Service as will be described in further detail to follow.

When calling the Web Service 160, macro 115 generates a request for data 120 that is provided to the Web Service. While generating request 120, macro 115 also generates a command for retrieving data 130. This command specifies the data that application 110 desires to receive from Web Service 160, for example current stock prices. In addition, macro 115 generates security information 140. Security information 140 is used to verify that application 110 has appropriate authorization to access Web Service 160. Both command 130 and security information 140 may be embedded into request 120.

There are many different ways that security information 140 may be generated by macro 115. Although specific examples will now be described, it should be noted that this is for illustration only and should not be used to limit the scope of the appended claims. As one skilled in the art will appreciate, there may be countless additional ways to generate security information in accordance with embodiments described herein. In addition, the different types of security information are not exclusive as more than one may be generated by the macro 115 and/or required by Web Services 160.

For example, in some embodiments, generating security information 140 comprises generating a signature. The signature may comprise specific data that uniquely identifies the macro author as a trusted author. Sending the signature allows Web Service 160 to determine that macro 115 was created by a trusted source. In some embodiments, the signature is generated as part of the macro language of macro 115. In other embodiments, the signature may be included in an external auxiliary file that is referenced by macro 115.

In some embodiments, generating the security information 140 comprises including a token. For example, the token may be a keyword or a special series of bits that enable macro 115 to securely send request 120 to Web Service 160 and in turn allow Web Service 160 to securely send the requested data to application 110. It is unlikely that a malicious party would know the token or be able to use the token to interfere with the communication between macro 115 and Web Service 160. In some embodiments, the token is generated as part of the macro language of macro 115. In other embodiments, the token may be included in an external auxiliary file that is referenced by macro 115.

In some embodiments, generating security data comprises including signature patterns from templates. For example, an IT department or other source may provide signature and/or token templates that are generated by a trusted source and that may be used to allow access to trusted Web Services. For example, application 110 may access the templates. The templates may provide all of the information or data that is needed to access the Web Services except for the actual signature. At the time a particular Web Service is to be accessed, the signature may be computed and plugged into the template by application 110. Use of the template ensures that application 110 does not need to worry about how to format the algorithms for generating the signature. The signature may then be used to access Web Service 160 as described previously.

In some embodiments, generating the security information 140 comprises referencing a policy. A policy is used to specify required authorization information. For example, a policy may specify which specific identities are trusted identities, for example a specific macro author. This allows for a party who controls application 110 or Web Service 160 to indicate who can author and share macros. In addition, the policy may indicate that a desired connection type or protocol must be used for transmitting data. In addition, a policy may include an inclusionary list that includes all the Web Services domains that an application may access or an exclusionary list that lists all of the domains that may not be accessed. As in the other cases previously described, in some embodiments, the policy is generated as part of the macro language of macro 115. In other embodiments, the policy may be included in an external auxiliary file that is referenced by macro 115.

In some embodiments, generating security information 140 comprises including delegation information. The delegation information is used to allow a trusted party to delegate appropriate authorization to another party. For example, party A may be a trusted party that has access to a valid signature or token. Party A can provide the valid signature or token to party B. The valid signature and/or token (i.e., the delegation information) can then be used by party B to access Web Service 160. Alternatively, party A may contact Web Service 160 and inform Web Service 160 that party B is party A's delegate. Party B will then be allowed access to Web Service 160.

In some additional embodiments, as described previously, macro 115 is an external file that is accessed by application 110. In this case, the macro may include one or more claims provided by a deployment authority, which may be an IT department that has control of application 110, which are used to prove authorization of the accessed macro. For example, the one or more claims may be a token or a signature. The claims would indicate to both application 110 and Web Services 160 that the accessed macro 115 was created by a trusted source. Accordingly, use of such claims allows the deployment authority to indicate who can write and share macros and allows Web Service 160 to know that the request 120 generated by macro 115 is from a trusted source.

In similar manner, Web Service 160 may provide one or more claims that are used to prove authorization to access the Web Service. For example, a Web Service 160 owner may only want to allow access to certain trusted sources. In this case, the Web Service owner may only grant the claims, which can be a signature, a token, a policy, etc. to an authorized macro 115 author. The claims would be embedded in the macro 115 or in an external file that is accessed by macro 115 and provided to Web Service 160 in the request for data 120.

Having been generated in the manner described, request for data 120 is provided to Web Service 160 over network 150 by macro 115. Upon receipt of the request 120, Web Service 160 verifies that the security information 140 provides appropriate authorization for access. For example, Web Service 160 may verify that security information 140 is a required signature or includes a required token. If the security information 140 provides appropriate authorization, then Web Service 160 reads the command for retrieving data 130 and accesses the requested data 162, which may be the updated stock prices for example. The requested data 162 may then be provided to application 110 over network 150 where it may be displayed by user interface 111. In this manner, a Web Service has been securely called by a macro and data has securely been provided from the Web Service to the calling application.

Referring now to FIG. 1B, an additional embodiment of computing environment 100 is illustrated. In this embodiment, computing environment 100 also includes a macro processing module 170 that is positioned between the macro 115 and network 150. Macro processing module 170 may be any hardware, software, or combination of the two that supports application 110. For examples, the macro processing module 170 may be the Common Language Runtime (CLR) that supports application 110. The macro processing module 170 receives the request 120 from macro 115 before the request is provided to Web Service 160. As previously described, request 120 includes a command for retrieving data 130 and security information 140.

The computing environment 100 may also include an IT department 180. IT department 180 may be the organization that controls access by the application 110 and macro 115 to the network 150. In other embodiments, the IT department may control access to and/or from Web services 160. In other embodiments, the IT department may control access to both the application 110 and the Web Service 160. The IT department 180 may determine access restrictions for which Web Services macro 115 may access. For example, IT department 180 may provide access restrictions 175 to macro processing module 170. These access restrictions may then be used by the macro processing module to determine if macro 115 has authorization to access a Web Service such as Web Service 160 as will be described in more detail to follow.

In one embodiment, to provide additional security to the communication between the Web Service 160 and the macro 115, the macro processing module 170 first determines if Web Services 160 has one or more access restrictions 165. If there are no access restrictions, then macro processing module 170 may provide the request over network 150 to Web Service 160.

However, if the Web Service 160 does include access restrictions 165 as is illustrated, then macro processing module 170 will verify that the macro 115 has appropriate authorization to access the Web Service 160 by processing the security information 140 against access restrictions 165. As described previously, access restrictions 165 may include data such as one or more policies that specify the appropriate authorization information required to access the data 162 in Web Service 160. For example, macro processing unit 170 may verify that security information 140 includes a required signature or token. In addition, macro processing unit 170 may verify that security information 140 includes one or more claims such as a signature or token that were previously provided by Web Service 160 to the author of macro 115.

If the macro processing module verifies that security information 140 includes appropriate authorization to access Web Service 160, then request 120 is communicated to Web Service 160 over network 150. The requested data 162 can then be accessed and provided to application 110 in the manner previously described. If, on the other hand, macro processing module 170 does not verify that security information 140 includes appropriate authorization, then request 120 will not be sent to Web Service 160.

In additional embodiments, as mentioned before, the one or more access restrictions may be dictated by the IT department 180. For example, the IT department 180 may dictate which Web Services macro 115 is allowed to access. In this case the access restrictions may be built into the language of macro 115 as security metadata. Alternatively, the IT department access restrictions may be part of an external file that is accessed by macro 115. The access restrictions may also be provided to the macro in other reasonable ways.

The access restrictions could include exclusionary rules such as, but not limited to, a list that indicates specific Web Services that macro 115 will be excluded from accessing. For example, the exclusionary list may include one or more policies that specify which specific Web Services macro 115 may not access. The exclusionary rules may also be other types of information such as signatures and tokens.

Alternatively, the one or more access restrictions may include inclusionary rules such as, but not limited to, a list that indicates specific Web Services that macro 115 will be allowed access to. This list may also be in the form of policy statements that specify the accessible Web Services, although this is not required. The inclusionary rules may also be other types of information such as signatures, tokens and/or a signed license from a trusted source allowing the macro to access specific Web Services.

In addition, the one or more access restrictions may comprise rules corresponding to Web Services. For example, the one or more access restrictions may include policies specifying different attributes about the types of Web Services that macro 115 may access or may not access. For instance the access restrictions may specify that macro 115 is allowed to access all Web Services controlled by a given trusted source.

macro processing module 170 receives the request 120 from macro 115 before the request is provided to Web Service 160 as described previously. However, as depicted in FIG. 1B, the IT department 180 has provided access restrictions 175 to macro processing module 170. Macro processing module 170 processes the access restrictions 175 against the access restrictions included in macro 115 (i.e., security information 140). If the macro processing module verifies that security information 140 includes appropriate authorization to access Web Service 160, then request 120 is communicated to Web Service 160 over network 150.

In additional embodiments, the IT department 180 may want to only allow access to controlled Web Services. For example, the IT department 180 may wish to restrict access to Web services that it considers sensitive. The IT department 180 may provide a <RestrictedAccess> command to the language of macro 115 for all sensitive Web Services. This would presumptively deny macro 115 access to these Web Services. However, the IT department 180 at times may determine that certain sensitive Web Services should be accessible to macro 115 for business or other provide Rather than change the language of macro 115, IT department 180 may provide to macro processing module 170 one or more policy statements (i.e., rules corresponding to Web Services) that say <RestrictedAcessOK> for the allowable sensitive Web Services as part of access restrictions 175. When the macro processing module 170 receives a request 120 for a restricted Web Service, it can process the one or more policy statements to see if access to the requested Web Service is allowed. For example, if access to Web Service 160 were requested, then the macro processing module 170 would check to ensure that access restrictions 175 included a <RestrictedAcessOK> policy for Web Service 160. If access was allowed, then macro processing module 170 would communicate the request 120 to Web Service 160.

Alternatively, the IT department 180 may desire to presumptively allow access to all Web Services. In this case, The IT department 180 may provide a <AllowAccess> command to the language of macro 115 for all Web Services. However, the IT department 180 at times may determine that certain sensitive Web Services should be restricted to macro 115. Rather than change the language of macro 115, IT department 180 may provide to macro processing module 170 one or more policy statements (i.e., rules corresponding to Web Services) that say <RestrictedAcess> for the sensitive Web Services as part of access restrictions 175. When the macro processing module 170 receives a request 120 for a Web Service, it can process the one or more policy statements to see if access to the requested Web Service is restricted. For example, if access to Web Service 160 were requested, then the macro processing module 170 would check to make that access restrictions 175 included a <RestrictedAcess> policy for Web Service 160. If access was not allowed, then macro processing module 170 would not communicate the request 120 to Web Service 160.

Figure 2:
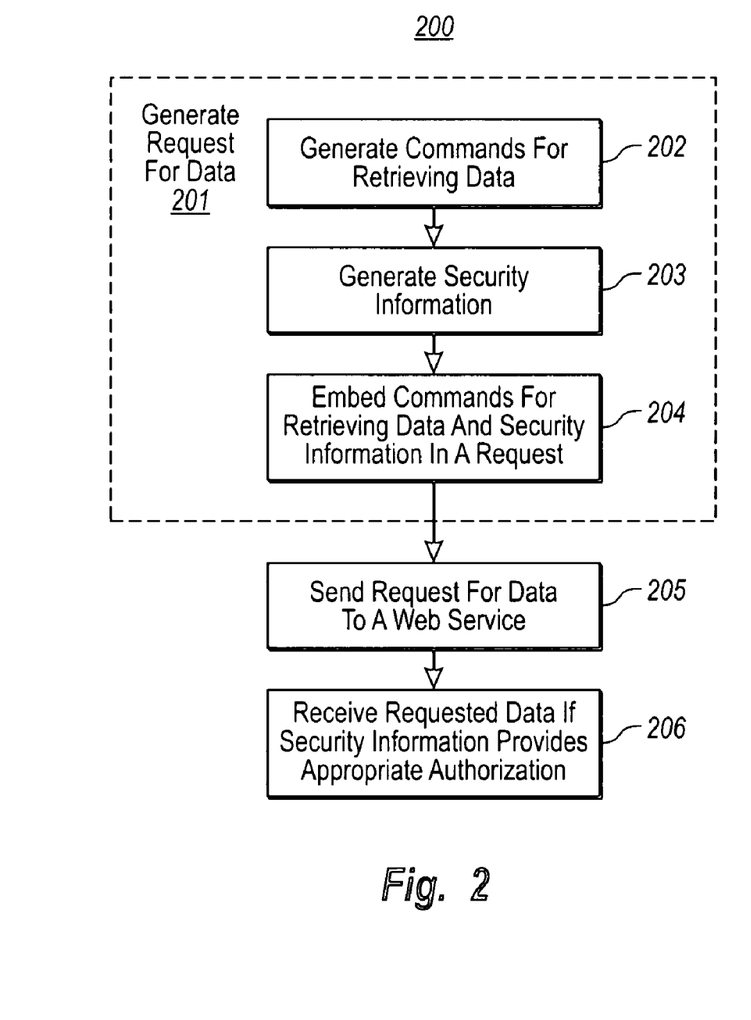
FIG. 2 illustrates a method of securing communications between a Web Service and an application including one or more macros for communicating with the Web Service in accordance with a first embodiment.

Referring now to FIG. 2, a method 200 for securing communication between a macro and Web Service is illustrated. Method 200 will be described with frequent reference to the computing environment discussed in relation to FIG. 1. However, it should be noted that the computing environment 100 is only one of numerous computing environments that can be configured to perform method 200 and should not be used to limit the scope of the appended claims.

FIG. 2 shows that method 200 includes, at a macro in an application, an act 201 of generating a request for data. For example, macro 115 of application 110 may generate a request for data 120.

FIG. 2 also shows that the act 201 of generating a request for data comprises an act 202 of generating a command for retrieving data. For example, a command for retrieving data 130 is generated by macro 115. The command for retrieving data includes information specifying the particular data requested from a Web Service such as Web Service 160.

FIG. 2 further shows that the act 201 of generating a request for data comprises an act 203 of generating security information. For example, security information 140 may be generated by macro 115. In one embodiment, the generated security information 140 may comprise a signature that uniquely identifies the macro author as a trusted source. The signature may be embedded in macro 115 or it may be included in an external auxiliary file that is referenced by macro 115.

In another embodiment, the generated security information 140 may comprise including a token that may be a keyword or a special series of bits that enable macro 115 to securely send request 120 to Web Service 160 and in turn allow Web Service 160 to securely send the requested data to application 110.

In still another embodiment, the generated security information 140 may comprise referencing a policy that is used to specify specific authorization information. For example, a policy may specify that a specific identity is a trusted macro author.

In yet another embodiment, the generated security information 140 may comprise including delegation information that is used to allow a trusted party to delegate appropriate authorization to another party.

FIG. 2 further shows that the act 201 of generating a request for data comprises an act 204 of embedding the command for retrieving data and the security information into a request. For example, the command to retrieve data 130 and security information 140 are embedded into request for data 120.

FIG. 2 also shows that method 200 includes an act 205 of sending the request for data to a Web Service. For example, macro 115 may send request for data 120 to Web Service 160 over network 150.

FIG. 2 finally shows that method 200 includes an act 206 of receiving the requested data from the Web Service if the security information provides appropriate authorization to receive the requested data. For example, application 110 may receive data 162 over network 150 from Web Service 160. This data is received if security information 140 provides appropriate authorization to receive the data 162. For instance, if requested data 120 was for updated stock prices, the updated stock prices are provided to application 110.

Figure 3:
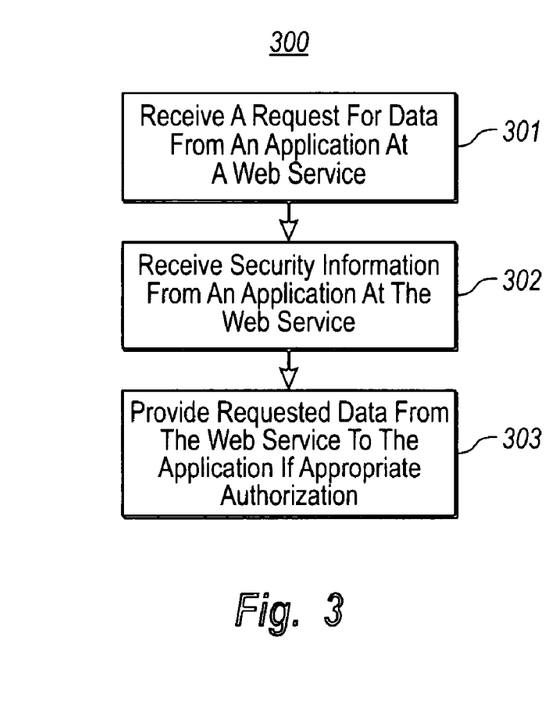
FIG. 3 illustrates a method of securing communications between a Web Service and an application in accordance with a second embodiment.

Referring now to FIG. 3, a method 300 for securing communication between an application and Web Service is illustrated. Method 300 will be described with frequent reference to the computing environment discussed in relation to FIG. 1. However, it should be noted that the computing environment 100 is only one of numerous computing environments that can be configured to perform method 300 and should not be used to limit the scope of the appended claims.

FIG. 3 shows that method 300 includes an act 301 of receiving a request for data from an application at a Web Service. For example, Web service 160 may receive request for data 120 from application 110 over network 150. The request 120 may be generated by macro 115.

FIG. 3 also shows that method 300 includes an act 302 of receiving security information from the application at the Web Service. For example, Web Service 160 may receive security information 140 from application 110 over network 150. Security information 140 may comprise a signature that is embedded in the request for data 120 or a signature that is accessed from a file that is external to the request for data. Security information may also be a token as previously described. In addition, the security information 140 may be one or more specific claims such as a signature or token that are provided by the Web Service to a macro author to prove authorization to access data of the Web Service.

FIG. 3 finally shows that method 300 includes an act 303 of providing the requested data from the Web Service to the application if the security information provides appropriate authorization to provide the requested data. For example, Web Service 300 may provide requested data 162 to application 110 over network 150. The requested data 162 is provided if the received security information 140 provides appropriate authorization to access and receive data 162.

Figure 4:
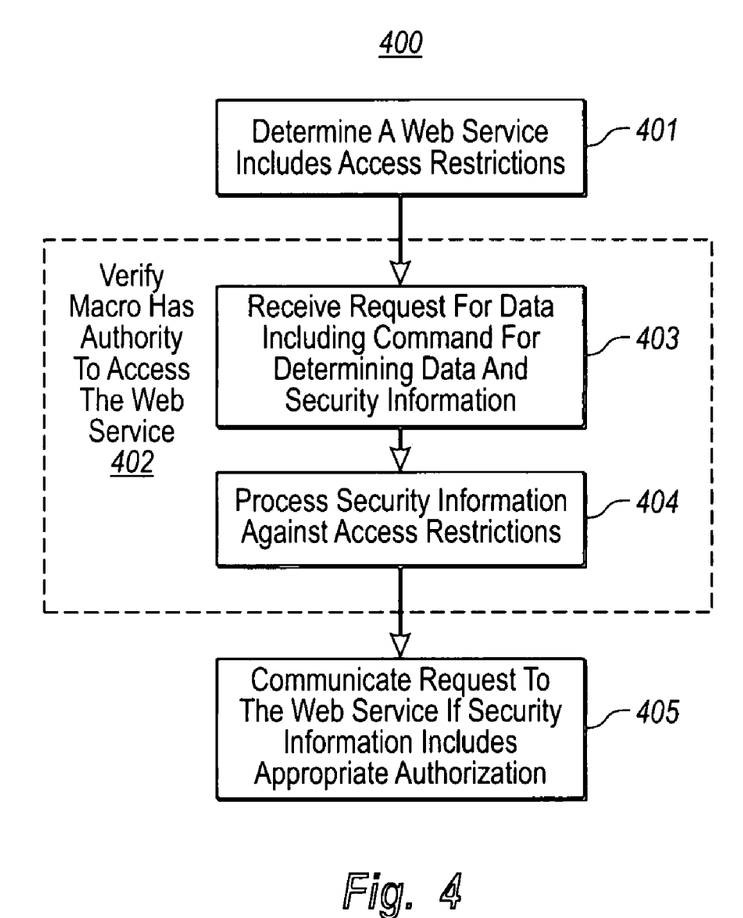
FIG. 4 illustrates a method for communicating with a Web Service in accordance with a third embodiment.

Referring now to FIG. 4, a method 400 for communicating with a Web Service is illustrated. Method 400 will be described with frequent reference to the computing environment discussed in relation to FIG. 1. However, it should be noted that the computing environment 100 is only one of numerous computing environments that can be configured to perform method 400 and should not be used to limit the scope of the appended claims.

FIG. 4 shows that method 400 includes, at a macro processing module, an act 401 of determining that a Web Service includes one or more access restrictions. For example, macro processing module 170 may determine that Web Services 160 includes one or more access restriction 165 by accessing Web Service 160 over network 150. As described previously, access restrictions 165 may include data such as one or more policies that specify the appropriate authorization information required to access the data 162 in Web Service 160.

Alternatively, the access restrictions for the Web Service may be provided by an IT department. For example, IT department 180 may dictate that macro 115 include language, either embedded in the macro language or accessed from an external file, that include access restrictions for Web Service 160. The access restrictions may include, but are not limited to, exclusionary rules that include a list restricting access to Web Service 160, inclusionary rules that include a list allowing access to Web Service 160, and/or rules corresponding to other Web Service 160 properties. Macro processing module 170 determines that macro 115 includes these access restrictions In still other embodiments, the IT department may provide access restrictions for a Web service to the macro processing module. For example, IT department 180 provides access restrictions 175 for Web Service 160 to macro processing module 170.

FIG. 4 shows that method 400 also includes, at the macro processing module, an act 402 of verifying that a macro has authority to access the Web Service. For example macro processing module 170 may verify that macro 115 has authority to access Web Service 160.

FIG. 4 also shows that the act 402 of verifying that a macro has authority to access a Web Service includes an act 403 of receiving a request for data from the macro. The request for data includes a command for retrieving data and security information. For example, macro processing module 170 receives request for data 120 from macro 115. Request for data 120 may include a command to retrieve data 130 and security information 140. Security information 140 may include all the types of security information already discussed in relation to FIGS. 1, 2, and 3 such as a signature and/or a token, exclusionary rules, inclusionary rules, rules corresponding to a Web Service, or any other suitable security information.

FIG. 4 also shows that the act 402 of verifying that a macro has authority to access a Web Service includes an act 404 of processing the security information against the access restrictions to determine appropriate authorization. For example, macro processing module 170 may process security information 140 to determine appropriate authorization. In some embodiments, macro processing module 170 may verify that security information 140 includes a signature or token required by access restrictions 165. In other embodiments, macro processing module 170 may verify that security information 140 includes one or more claims such as a signature or token that were previously provided by Web Service 160 to the author of macro 115 to prove authorization.

In still other embodiments, macro processing module 170 verifies that macro 115 has authority by processing the access restrictions 175 against the access restrictions included in security information 140 that was dictated by IT department 180.

In additional embodiments, macro processing module 170 includes access restrictions 175 including the policy statements for certain specified Web Services such as Web Service 160. Macro processing module 170 checks these polices against the security information 140 to determine if the requested Web Service is access restricted or not as previously described.

Finally, FIG. 4 shows that method 400 includes an act 405 of communicating the request to the Web Service if the security information of the macro includes appropriate authorization to access the Web Service. For example, macro processing module 170 may communicate request for data 120 to Web Service 160 if security information 140 provides appropriate authorization. For instance, if security information is a signature that is allowed by access restrictions 165, then request 120 will be sent over network 150 to Web Service 160. If, however, the security information 140 does not provide appropriate authorization, then the request for information 120 will not be sent to Web Services 160.

In like manner, if macro 115 includes access restrictions that are allowed by access restrictions 175, then request 120 will be sent over network 150 to Web Service 160. Alternatively, if access restrictions 175 include a policy statement allowing access for an otherwise restricted Web Service, the request 120 will be sent over network 150 to Web Service 160. Accordingly, the communication between the macro of the application and the Web Service is secured against unwanted interference.

Figure 5:
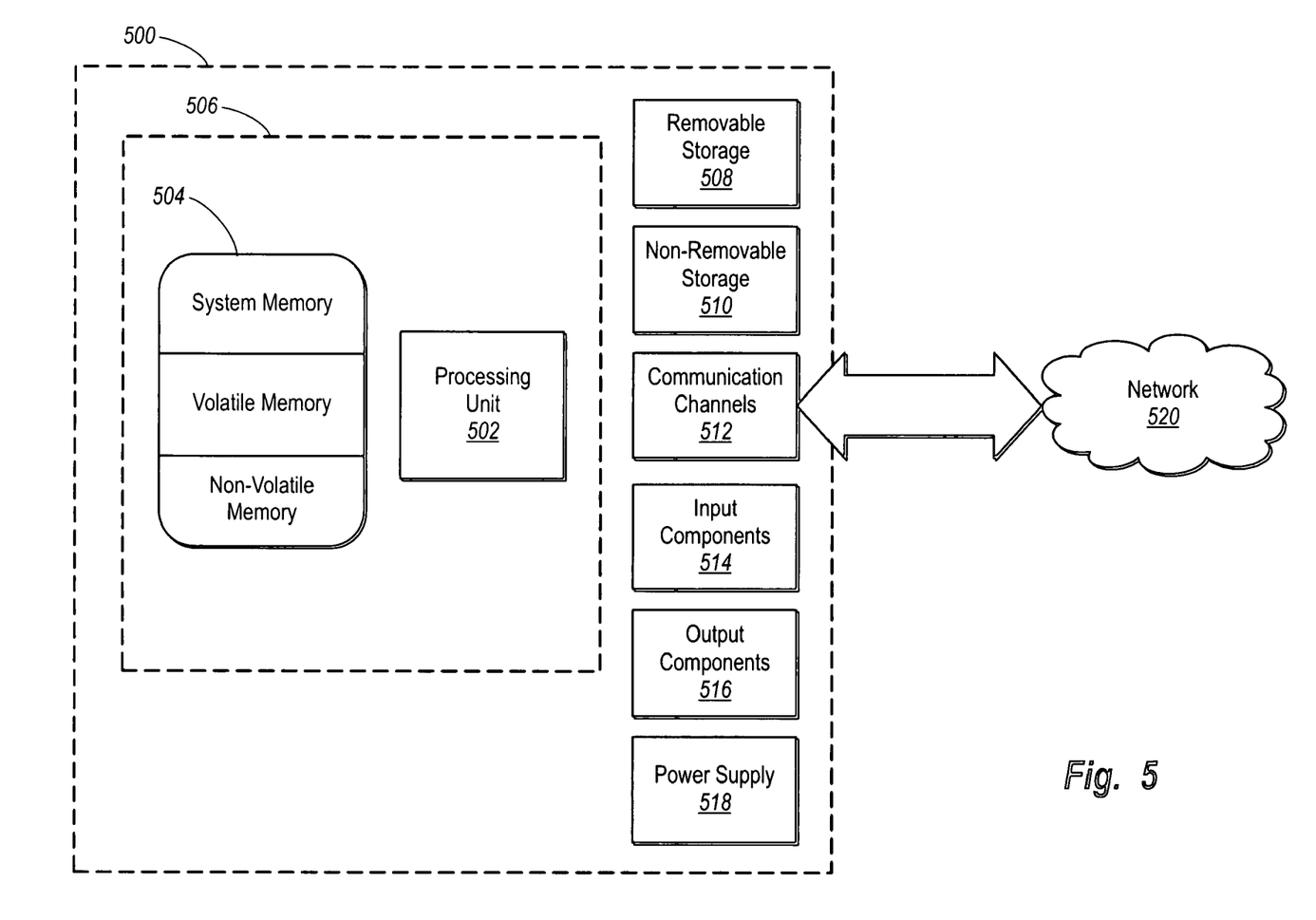
FIG. 5 illustrates a suitable computing system in which various embodiments may be implemented.

Referring to FIG. 5, a schematic diagram of an example computer architecture 500 usable for the embodiments herein described is shown. For descriptive purposes, the architecture portrayed is only one example of a suitable environment and is not intended to suggest any limitation as to the scope of use or functionality of the disclosed embodiments. Neither should the computing systems be interpreted as having any dependency or requirement relating to any one or combination of components illustrated in FIG. 5.

The embodiments described herein are operational with numerous other general-purpose or special-purpose computing or communications environments or configurations. Examples of well-known computing systems, environments, and configurations suitable for use with the disclosed embodiments, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 500 typically includes at least one processing unit 502 and memory 504. The memory 504 may be volatile (such as RAM), non-volatile (such as ROM, flash memory, etc.), or some combination of the two. This most basic configuration is illustrated in FIG. 5 by the dashed line 506. For example, application 110 of FIG. 1 may be stored memory 504. Application 110 may be, for example, any type of computer application that is capable of supporting one or more macros. Examples of well known applications that support macros are spreadsheets and word processing applications.

In addition, macro 115 may be processed by processing unit 502. Macro 115 may be created by any reasonable technique. In some embodiments, macro 115 is embedded in application 110. In other embodiments, macro 115 may be accessed from some other portion of computing environment 100 by application 110.

The storage media devices may have additional features and functionality. For example, they may include additional storage (removable and non-removable) including, but not limited to, PCMCIA cards, magnetic and optical disks, and magnetic tape. Such additional storage is illustrated in FIG. 5 by removable storage 508 and non-removable storage 510. Computer-storage media include volatile and non-volatile, removable and non-removable media implemented in any method or technology for storage of information such as computer-readable instructions, data structures, program modules, or other data. Memory 504, removable storage 508, and non-removable storage 510 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in software and hardware or hardware are also possible and contemplated.

Computing system 500 may also contain communication channels 512 that allow the host to communicate with other systems and devices over, for example, network 520. For example, network 520 may correspond to network 150 of FIG. 1. Although the network 520 may include any network type (whether now existing or to be developed in the future), examples include Token Ring, Ethernet, Bluetooth, 802.11, USB, 1394, SMS, SOAP over IP, or the like. Communication channels 512 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media. Computing system 500 may extend beyond a single computational node to utilize the network for distributed processing.

The computing system 500 may also have input components 514 such as a keyboard, mouse, pen, a voice-input component, a touch-input device, and so forth. Output components 516 include screen displays such as user interface 111 of FIG. 1. The user interface 111 of FIG. 1 depicts a spreadsheet that displays the number of shares and current price of a stock portfolio. Output components 516 also include speakers, printer, etc., and rendering modules (often called "adapters") for driving them. The computing system 500 has a power supply 518. All these components are well known in the art and need not be discussed at length here.

While FIG. 5 represents a suitable operating environment for the disclosed embodiments, the disclosed embodiments may be employed in any computing system. The computing system illustrated in FIG. 5 is illustrative only, and by no means represents even a small portion of the wide variety of environments in which the disclosed embodiments may be implemented. In the description and in the claims, a "computing system" is defined broadly as any hardware component or components that are capable of using software to perform one or more functions. Examples of computing systems include, but are not limited to, desktop computers, laptop computers, Personal Digital Assistants (PDAs), telephones, or any other system or device that has processing capability.

Although the subject matter has been described in language specific to the structural features and/or methodological acts, it is to be understood that the subject matter defined in the appended claims is not necessarily limited to the specific features and acts described above. Rather, the specific features and acts described above are disclosed as example forms of implementing the claims.

We Claim:

1. In a computing environment including one or more interconnected agents, including an application that includes access to one or more macros for communicating with a Web Service, a method implemented by a computing system with a processor of securing communications between the one or more macros and the Web Service, the method comprising:
    at a macro accessed by an application, generating a particular request for data from a Web Service, wherein generating the particular request for data comprises:
    generating commands for retrieving data;
    generating security information, the security information including one or more claims that indicate to the Web Service that the macro was authored by an authorized macro author and that the macro is authorized to access the Web Service; and
    embedding the commands for retrieving data and the security information in the request;
    a macro processing module accessing the particular request and analyzing the particular request, based on one or more policy statement, to determine whether the macro has authority to access the Web Service; and
    wherein, if it is determined that the macro has authority to access the Web Service, the macro processing module sends the particular request for data unmodified on to the Web Service, and the macro receiving the requested data from the Web Service in response to the particular request and in response to the Web Service determining the security information, including the one or more claims, provides appropriate authorization for the macro to receive the requested data, and
    wherein, if it is determined that the macro does not have authority to access the Web Service, the macro processing module refrains from sending the particular request for data on to the Web Service.

2. The method of claim 1, wherein generating security information comprises generating a signature.

3. The method of claim 1, wherein generating security information comprises including a token.

4. The method of claim 1, wherein generating security information comprises generating macro language commands.

5. The method of claim 1, wherein generating security information comprises referencing an auxiliary security file that is external to the computing system.

6. The method of claim 1, wherein generating security information comprises referencing a policy.

7. The method of claim 6, wherein the policy specifies at least one of an identity, connection type, protocol, or domain.

8. The method of claim 1, wherein the one or more claims were provided by the Web Service to the author of the macro.

9. The method of claim 1, wherein the one or more claims were provided by a deployment authority to the author of the macro and wherein the one or more claims also prove to the application that the macro was created by a trusted source.

10. The method of claim 1, wherein generating security information comprises including delegation information.

11. In a computing environment including one or more interconnected agents, including a Web Service configured to receive requests for data from an application having access to one or more macros, a method implemented by a computing system with a processor of securing communications between the application and the Web Service, the method comprising:
    receiving a particular request for data from an application at a Web Service,
    wherein the particular request is originated by a macro accessed by the application and is forwarded unmodified on to the Web Service by a macro processing module that accesses the particular request and determines, based on one or more policy statement, whether the macro has authority to access the Web Service, and wherein the macro processing module refrains from sending any request for data on to the Web Service that the macro processing module has determined does not have authority to accesses data from the Web Service;
    receiving security information from the application at the Web Service, the security information including one or more claims that indicate to the Web Service that the macro was authored by an authorized macro author and that the macro is authorized to access the Web Service; and
    providing the requested data from the Web Service to the application if the security information, including the one or more claims, provides appropriate authorization to provide the requested data.

12. The method of claim 11, wherein receiving security information comprises receiving a signature.

13. The method of claim 12, wherein the received signature is one of a signature embedded in the request for data and a signature that is accessed from a security file that is located external to the computing system.

14. The method of claim 11, wherein receiving security information comprises receiving a token.

15. The method of claim 11, wherein the Web Service requires that one or more specific claims be presented to it by the application for proving authorization.

16. In a computing system including a processor and an application having access to one or more macros for communicating with a Web Service and a macro processing module, a method of communicating with the Web Service, the method comprising at the macro processing module:

receiving a particular request at the macro processing module, originating from a macro and to be sent to a Web Service for data;

determining that a Web Service includes one or more access restrictions; and the macro processing module determining whether the macro has authority to access data from the Web Service based on the one or more access restrictions and based upon security information contained in the request, the security information including one or more claims that indicate to the Web Service that the macro was authored by an authorized macro author and that the macro is authorized to access the Web Service;

wherein if the macro has authority to access the data from the Web Service, verifying that the macro has authority to access the Web Service by processing the security information, including the one or more claims, against the access restrictions to determine appropriate authorization; and communicating the particular request unmodified to the Web Service if the security information of the macro includes appropriate authorization to access the Web Service.

17. The method of claim 16, wherein the one or more access restrictions are dictated by an IT department.

18. The method of claim 17, wherein the one or more access restrictions comprise exclusionary rules including a list of restricted Web Services.

19. The method of claim 17, wherein the one or more access restrictions comprise inclusionary rules including a list of allowed Web Services.

20. The method of claim 17, wherein the one or more access restrictions comprise rules corresponding to Web Services.

* * * * *